Dec. 17, 1963 J. KLERER 3,114,663

METHOD OF PROVIDING SEMICONDUCTOR WAFERS WITH PROTECTIVE AND MASKING COATINGS

Filed March 29, 1960

INVENTOR.
JULIUS KLERER
BY
W.S. Hill
AGENT 3,114,663
Patented Dec. 17, 1963

3,114,663

METHOD OF PROVIDING SEMICONDUCTOR WAFERS WITH PROTECTIVE AND MASKING COATINGS

Julius Klerer, Somerville, N.J., assignor to Radio Corporation of America, a corporation of Delaware Filed Mar. 29, 1960, Ser. No. 18,342
6 Claims. (Cl. 148—179)

Figure 1:
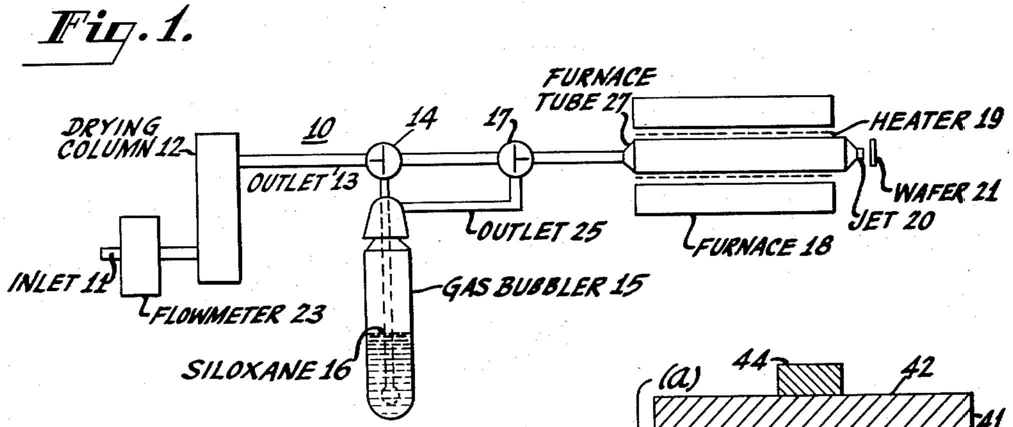

This invention relates to an improved method of making improved semiconductor devices. More particularly, the invention relates to an improved method of applying a coating to semiconductor devices, which coating has a protective function and which also may be utilized to aid in forming surface alloyed rectifying electrodes on the semiconductor body.

One method of fabricating junction type semiconductor devices is known as surface alloying. This method includes the step of positioning an electrode pellet upon one face of a suitably prepared given conductivity type semiconductive wafer. The pellet comprises a material, such as an electron acceptor or a donor, which is capable of inducing opposite conductivity type in the wafer. The assemblage of pellet and wafer is then heated to a temperature above the melting point of the pellet but below the melting point of the wafer, so that the pellet melts and dissolves a small portion of the wafer material. Subsequently, the dissolved wafer material is recrystallized in the original semiconductor lattice, but contains sufficient pellet material to form a zone of opposite conductivity type. The heating step is usually performed in a non-oxidizing ambient, in order to avoid chemical reactions such as oxidation of the wafer surface. When the assemblage is cooled, a rectifying barrier known as a PN junction is formed between the pellet and the wafer.

A serious problem in the fabrication of surface alloyed devices is the susceptibility of the completed units to deterioration during storage. It has been found that such semiconductor junction devices are adversely affected by the presence of even small amounts of water or water vapor. Junction units are also sensitive to oxygen and other active gases such as hydrogen sulfide or sulfur dioxide which may be present in the atmosphere. In order to obtain surface alloyed devices with stable electrical properties, it has been found necessary to use expensive special procedures, for example to encapsulate the completed units with a liquid silicone resin, dry the units one hour in air, bake the units 4 hours at about 100° C., then case the units in hermetically sealed metal cans. As an additional precaution, the metal case is filled with a potting material such as a semi-solid resin, or a mixture of such a resin with a drying agent such as alumina. Although these methods have been found to produce satisfactory stable units, they tend to increase considerably the manufacturing time and cost per unit.

Another problem in the fabrication of surface alloyed devices is the irregular and excessive lateral spreading of electrode pellets over the wafer during the alloying step. Such spreading of the electrode pellet is undesirable because it results in excessive collector capacitance, and produces junctions of variable size and shape, thereby causing variable electrical characteristics in the completed device. A related problem in the fabrication of surface alloyed devices is known as "pull back." In this phenomenon, the molten electrode pellets spread out over a relatively large area of the semiconductor wafer during the heating step, but subsequently on cooling tend to "pull back" under the influence of surface tension so that the solidified electrode covers a relatively small area of the wafer. This effect is undesirable since it leaves a thin film of the pellet material over an irregular area concentric to the electrode pellet. Subsequently, special care is required to make sure that the film of pellet material left on the wafer by "pull back" is completely removed by the application of etchants to the wafer.

It is known to restrict the lateral spreading of surface alloyed electrodes by vacuum evaporation of silicon monoxide or silicon dioxide over the surface of a semiconductor wafer which has had part of its surface covered with a removable masking material. An electrode pellet is subsequently alloyed to the previously masked portion of the wafer. See, for example, U.S. 2,796,562, assigned to the same assignee. Such vacuum evaporated silicon oxide coatings have been found to improve the yield of surface alloyed devices by restricting the surface diffusion of the electrode pellet. However, such vacuum evaporated silicon oxide coatings are not sufficiently adherent on germanium wafers and are sometimes adversely affected by the action of solvents such as water and acetone, which are used in device fabrication. Furthermore, such vacuum evaporated coatings require special equipment, such as vacuum furnaces, valves, pumps, and the like, which increase the manufacturing cost per unit. It is therefore desirable to discover a simple, rapid and economical method of applying a silicon oxide coating to germanium and other crystalline semiconductors, which coating will be adherent to the semiconductor.

Silicon oxide coatings have also been used to control the size and shape of rectifying barriers formed in a semiconductor wafer by the diffusion process, in which a semiconductive wafer is heated in an ambient containing a type-determining substance capable of imparting opposite conductivity type to the particular semiconductor employed. Portions of the wafer may be provided with a silicon oxide masking coating prior to the diffusion step. The type-determining substance diffuses considerably faster in those regions of the wafer which are not masked than in the regions masked with a silicon oxide coating. The silicon oxide may be genetically derived from the semiconductor wafer itself, for example by heating a silicon wafer in the presence of an oxidizing agent so as to convert a surface layer of the silicon to silicon oxide. The oxidant may be water vapor, as described in U.S. 2,802,760. This method is not suitable for other semiconductors such as germanium and the III–V compounds, which are more sensitive to oxidation than silicon. Furthermore, the thickness of the semiconductor wafer is reduced by a variable amount, depending on the thickness of the oxidized layer. This introduces an undesirable variation in the distance between rectifying barriers, and hence in the electrical characteristics of devices made from such wafers.

Another method of forming a genetic protective coating comprises immersing the semiconductor wafer in an oxidizing bath, such as a mixture of hydrogen peroxide and hydrofluoric acid, in order to form a coating of the semiconductor monoxide over the wafer. Thereafter the semiconductor monoxide layer is protected by a film of the semiconductor dioxide, which is formed by anodic oxidation in a bath of acetic acid containing a few percent of dissolved anhydrous sodium acetate. See, for example, U.S. 2,875,384, assigned to the same assignee. Such coatings have been very effective in stabilizing the current transfer ratio and the surface recombination velocity of semiconductor junction devices. Although this method will produce a germanium oxide coating on a germanium wafer, and a silicon oxide coating on a silicon wafer, it will not produce a silicon oxide coating on a germanium wafer. Furthermore, it is desirable that the method of applying the silicon oxide protective coating be accomplished in a single rapid and inexpensive step.

It is an object of this invention to provide an improved method of fabricating semiconductor devices.

Another object of the invention is to provide an improved method of producing rectifying barriers in semiconductive wafers.

Yet another object is to provide an improved method of alloying an electrode pellet to a semiconductive wafer.

Still another object is to provide an improved method of controlling the size and shape of rectifying barriers in semiconductive devices.

But another object is to provide an improved method of stabilizing the electrical characteristics of semiconductor devices.

These and other objects are accomplished by directing the decomposition products of an organic siloxane compound against the device while maintaining the temperature of the decomposition products between 130° C. and 300° C. This is conveniently accomplished in the following manner. An organic siloxane compound is thermally decomposed, and the decomposition products of the compound are forced through a jet, so as to impinge upon and coat a semiconductor device. The temperature of the jet impinging upon the wafer is readily controlled, so that the device is coated at a relatively low temperature. The electrical parameters of the device, such as current amplification factor, reverse saturation current and reverse breakdown voltage, are thereby stabilized. In one embodiment of the invention, a portion of a given conductivity type semiconductive wafer is temporarily masked, then coated over all my means of a jet of siloxane decomposition products. The temporary mask is removed and at least one electrode pellet containing material capable of inducing opposite conductivity type is then alloyed to the uncoated portion or portions of the wafer. In another embodiment, the electrode pellet is affixed to a major face of a semiconductive wafer. The assemblage of wafer and electrode is then placed in a jet of siloxane decomposition products so as to coat the major wafer face except for a portion covered by the electrode. Thereafter, the assemblage is heated to alloy the electrode to the wafer.

Figures 2, 3:
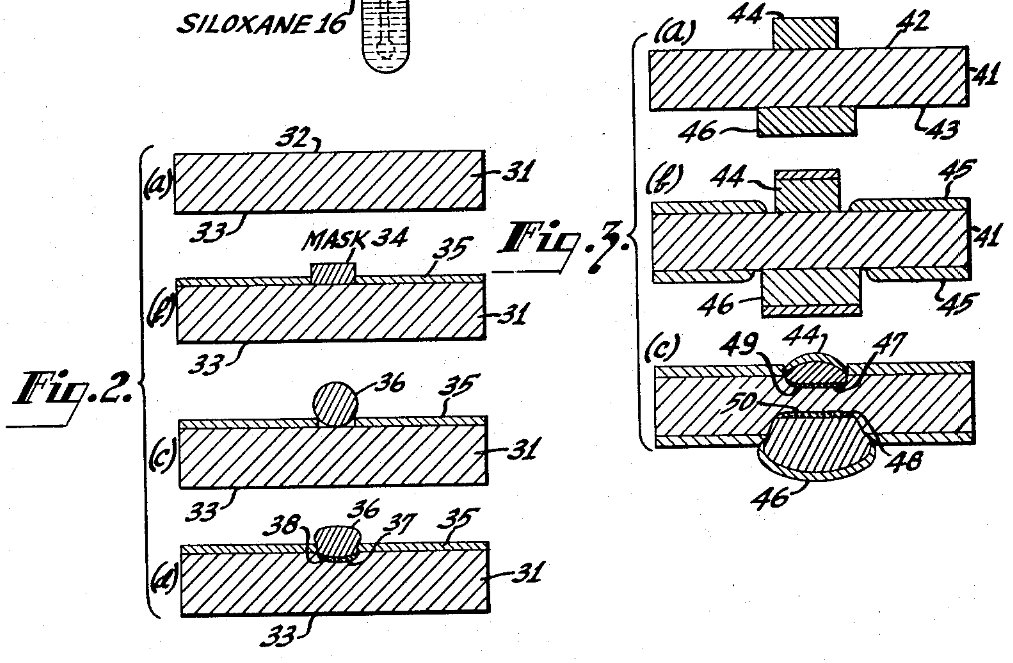
Figure 4:
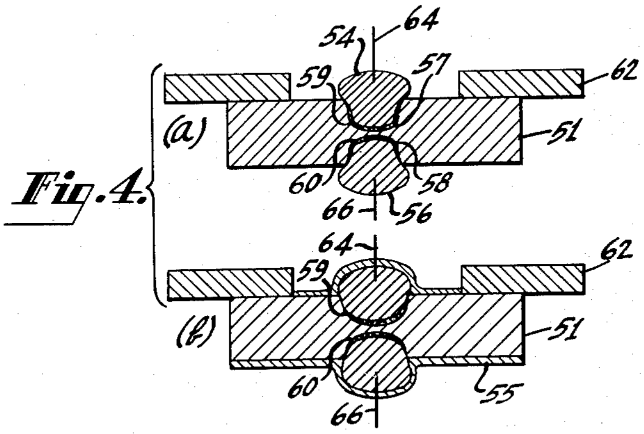

The invention will be described in greater detail in connection with the accompanying drawing, in which:

FIGURE 1 is a schematic cross-sectional view of apparatus useful in the practice of the invention;

FIGURES 2*a*–2*d* are cross-sectional schematic views of successive steps in the fabrication of a semiconductor device in accordance with one embodiment of the invention;

FIGURES 3*a*–3*c* are cross-sectional schematic views of successive steps in the fabrication of a semiconductor device in accordance with another embodiment of the invention; and, FIGURES 4*a*–4*b* are cross-sectional schematic views of successive steps in the treatment of a semiconductor device in accordance with another embodiment of the invention.

An apparatus useful for applying a protective coating of silicon oxide to a semiconductor wafer at relatively low temperatures is illustrated in FIGURE 1. The reaction chain 10 may be made of Vycor, fused quartz, or the like. A stream of an inert purified carrier gas enters the reaction chain 10 at inlet 11. The rate of flow of the carrier gas is controlled by a flowmeter 23. The gas is passed through a drying column 12, which contains a granulated drying agent such as silica gel, calcium sulfate, alumina, or the like. The carrier gas may, for example, be nitrogen, helium, neon, argon, and the like. In this example, the carrier gas is argon. The dried argon leaves drying column 12 through outlet 13. The flow of the dried argon is controlled by a three-way stopcock 14. The dried argon is passed into a gas bubbler 15, which contains a siloxane compound 16. In this example, the compound 16 consists of ethyl-triethoxy-silane, so that the stream leaving gas bubbler 15 is a mixture of argon and the vapors of ethyl-triethoxy-silane. The flow of the stream leaving bubbler 15 by way of outlet 25 is controlled by a second stopcock 17. The stream of argon and ethyl-triethoxy-silane vapors is now passed into a furnace tube 27 contained in a furnace 18 equipped with a heater 19, such as electrical resistance elements or globars. Furnace 18 is maintained at a temperature above the temperature at which the siloxane compound 16 begins to decompose. Siloxanes generally begin to decompose at temperatures above 600° C. In this example, the furnace 19 is maintained at a temperature of about 700° C., which is sufficient to decompose the siloxane vapors into a mixture of silicon oxides and organic radicals. The resulting mixture of silicon oxide and organic radicals is swept by the carrier gas stream out of the furnace 19 through a constricted orifice or jet 20, which directs the stream of argon and decomposition products against one major face of a semiconductor wafer 21. The jet stream cools off rapidly as it leaves the jet 20, and hence the temperature of the jet stream impinging on the wafer 21 may be varied by varying the distance between the orifice or jet 20 and the wafer 21. In this example, the distance between jet 20 and semiconductor wafer 21 is about 2 millimeters, and the temperature of the jet impinging on wafer 21 is about 150° C.

Another method of controlling the exit temperature of the jet stream while keeping the furnace temperature constant is to vary the rate of flow of the carrier gas. Upon varying the furnace temperature and rate of carrier gas flow, a series of curves was obtained by plotting the furnace temperature T versus $\Delta T$, where $\Delta T$ is the decrease in temperature of the jet stream, i.e., the internal furnace temperature minus the exit gas temperature. These curves were linear for rates of carrier gas flow between 2 and 10 cubic feet per hour. The slopes of the curves were approximately equal for carrier gas flow in the range of 2 to 10 cubic feet per hour, and could be fitted to a series of linear equations of the form $\Delta T=a+bT$, where T is the furnace temperature in degrees centrigrade, $b$ is a constant whose value depends on the orifice diameter, and $a$ is a constant fixed by the rate of flow of carrier gas, but also dependent on the orifice diameter. In this example, the orifice diameter was 12 millimeters, and the value of $b$ was 0.55. The value of$a$ was −36, −80, −113, −140, and −159 for carrier gas flow rates of 2, 4, 6, 8 and 10 cubic feet per hour respectively. Thus, the temperature of the jet stream impinging on the semiconductor wafer can be controlled by varying either the rate of flow of the carrier gas, the furnace temperature, or the distance between the jet orifice and the wafer. For best results, it has been found preferable to adjust these parameters so that the temperature of the jet stream impinging on the wafer is between 130° C. and 300° C.

A preferred example of the method will set forth the fabrication of a surface alloyed rectifying diode according to one embodiment of the invention. However, it is to be understood that the method is equally applicable to the construction of other semiconductor devices, such as tunnel diodes, PNPN diodes, triode transistors, hook transistors, tetrodes and the like.

*Example I*

A wafer of crystalline semiconductive material 31 such as germanium, silicon, gallium arsenide and the like, is prepared with opposing major faces 32 and 33, as illustrated in FIGURE 2*a*. The wafer may be of either conductivity type. In this example, wafer 31 consists of N-type germanium. The exact size and shape of the wafer is not critical. In this example, wafer 31 is about 6 mils thick, 50 mils square, and has a resistivity in the range of .1 to 20 ohm centimeters. The wafer faces 32 and 33 are cleaned by etching wafer 31 with a mixture of nitric and hydrofluoric acids, washing the wafer in deionized water and drying the wafer.

Referring now to FIGURE 2*b*, a mask 34 of selected size and shape is placed on one major face 32 of germanium wafer 31. The configuration of the mask 34 is chosen to correspond to the electrode shape subsequently desired, while the material of the mask is selected from those substances which are inert with respect to the semiconductor wafer 31. The mask may comprise, for example, a disc of stainless steel, mica, graphite, or the like. In this example, mask 34 is a stainless steel disc 3 mils thick and 10 mils in diameter. The masked wafer is then positioned in proximity to jet 20 of the apparatus previously described in connection with FIGURE 1, and a coating of silicon oxide 35 is deposited over wafer face 32 except for the portion covered by mask 34. A small area of wafer face 32 immediately around the periphery of the mask 34 is not covered by coating 35, due to the shadowing effect of the mask. The temperature of the jet stream impinging on the wafer is about 200° C. The precise nature of coating 35 thus produced is not certain. It is believed to consist principally of silicon dioxide, but some silicon monoxide may also be present. While the exact thickness of coating 35 is not critical, it has been found advantageous to utilize a coating at least 500 Angstroms thick. If the silicon oxide coating is too thick, it tends to separate from the semiconductor wafer 31 due to mismatch of thermal coefficients, and for this reason it is preferred that the thickness of the silicon oxide coating does not exceed 20,000 Angstroms.

Next, the mask 34 is removed and an electrode pellet 36 is positioned on the previously masked portion of wafer 31, as illustrated in FIGURE 2*c*. The electrode pellet 36 comprises or contains a material capable of inducing opposite conductivity type in the semiconductor wafer. Such materials are known in the art as active impurities, and are classified as donors or acceptors depending on whether they induce N-type or P-type conductivity respectively. Since wafer 31 is N-type germanium, electrode pellet 36 is selected from those materials which are acceptors in germanium. In this example, electrode pellet 36 is an indium dot or spherule having a diameter of 12 mils. It is preferred to have the dot slightly larger than the mask previously used, so that the shadowed region which was not completely coated with silicon oxide is covered by the alloyed dot.

Referring now to FIGURE 2*d*, the assemblage of wafer 31 and electrode pellet 36 is heated in a non-oxidizing atmosphere for about 10 to 20 minutes at a temperature of 500° C. During this step, the pellet 36 melts and dissolves a portion of the wafer material. When the assemblage is cooled, the dissolved wafer material precipitates and is recrystallized in the original crystal lattice of the wafer. The recrystallized region 37 contains sufficient indium to be of P-conductivity type, and thus a rectifying barrier or PN junction 38 is formed at the interface between the recrystallized P-type region 37 and the N-type bulk of wafer 31. During the heating step, the indium pellet 36 tends to spread laterally over the wafer surface, and on cooling assumes a characteristic shape. However, the extent of this lateral dot spreading is now limited by the silicon oxide coating 35 to the previously uncoated portion of wafer face 32. Accordingly, the size and shape of PN junction 38 in semiconductor devices thus fabricated is uniform, and hence the electrical characteristics of these devices are constant.

Since devices thus fabricated have little or no pullback, the subsequent etching step may be milder than in the prior art. The portion of the wafer surface covered by the protective silicon oxide coating need not be etched. It is only necessary to clean up a small area immediately around the periphery of the alloyed electrode. An etchant consisting of 30% hydrogen peroxide may be utilized for this purpose. The unit is treated in the hydrogen peroxide etchant for 15 minutes at 70° C. Any mild etchant may be used provided it does not contain hydrofluoric acid, since hydrofluoric acid attacks the silicon oxide coating. After the etching step, the device is completed by attaching lead wires (not shown) to electrode 36 and wafer face 33, and encapsulating the device by methods known to the art.

It will be understood that various modifications of this embodiment may be made without departing from the spirit and scope of the invention. Other crystalline semiconductors such as indium phosphide and germanium-silicon alloys may be utilized for the wafer. Conductivity types of the various regions in the device may be reversed by utilizing a P-conductivity type wafer and an electrode pellet containing a material which is a donor in the semiconductor utilized. Other siloxanes such as dimethyl diethoxysilane, tetraethoxysilane, amyl triethoxysilane, phenyl triethoxysilane, and vinyl triethoxysilane may be employed.

Although the above example described the fabrication of a two-terminal diode, it is equally feasible to fabricate a triode transistor starting with a given conductivity type semiconductive wafer as in FIGURE 2*a*, by masking portions of two opposing major wafer faces, thermally decomposing an organic siloxane compound, and forcing the decomposition products of the compound through a jet so as to impinge upon and coat the unmasked portions of the wafer. Thereafter the masks are removed, and an electrode pellet is alloyed to each previously masked portion of the two opposing major faces. Each electrode pellet contains an impurity substance capable of inducing opposite conductivity type in the wafer, thereby forming a pair of associated rectifying barriers in the wafer. The deposition of silicon oxide may be accomplished in two steps by first masking and coating one major wafer face, then turning the wafer over and masking and coating the opposing wafer face. Alternatively, two masks may be coaxially positioned on opposing wafer faces, and the silicon oxide coating deposited over the entire wafer in a single operation. The two electrode pellets may then be pressed to the uncoated portions of the opposing major wafer faces, and both pellets alloyed to the wafer in a single heating step. The units are completed by attaching electrode leads, base leads, and encapsulating the devices by techniques known to the art.

When surface alloyed transistors are fabricated by the prior art methods, it is necessary to perform the alloying step in a non-oxidizing ambient such as line nitrogen or forming gas, in order to protect the semiconductor wafer from oxidation. Special equipment, such as pumps and valves, is required to furnish the non-oxidizing ambient. It has been unexpectedly found that when surface alloyed transistors are manufactured according to the invention, with the semiconductor wafer having a coating of silicon oxide except for the portions where the electrode pellets are to be alloyed, the heating step may be performed in air, since the oxide coating protects the wafer from oxidation. Device production is thereby simplified and unit costs are reduced.

Another embodiment of the invention will now be described in connection with the fabrication of a surface alloyed transistor.

*Example II*

A wafer 41 of crystalline semiconductive material is prepared with opposing major faces 42 and 43, as illustrated in FIGURE 3*a*. This example will describe the fabrication of one of the most popular types of semiconductor devices, the surface alloyed indium-germanium PNP triode transistor. Accordingly, the wafer 41 consists of N-type germanium in this example, and is about 100 mils square and 6 mils thick. Emitter electrode pellet 44 and collector electrode pellet 46 are coaxially positioned on wafer faces 42 and 43 respectively. Emitter pellet 44 is a disc 15 mils thick, 25 mils in diameter, and consists of 99.5% indium–0.5% gallium by weight. Collector pellet 46 is a similar but larger disc having a diameter of 45 mils. The electrode pellets 44 and 46 are affixed to wafer 41 by low temperature soldering, or more simply by means of pressure.

Referring now to FIGURE 3*b*, the assemblage of wafer 41 and electrode pellets 44 and 46 is positioned in proximity to jet 20 of the apparatus previously described in connection with FIGURE 1, and a silicon oxide coating 45 is deposited over the major wafer faces and electrode pellets. In this example, the silicon oxide coating 45 is about 2000 Angstroms thick. The electrode pellets 44 and 46 have a shadowing effect during the deposition of coating 45 so that a small portion of the wafer surface immediately adjacent the electrode pellets is not covered, or covered very slightly, by the silicon oxide.

Next, the assemblage of wafer and electrode pellets is heated in forming gas for about 10 to 20 minutes at a temperature of 550° C. During this step, each electrode pellet melts and dissolves some of the germanium. When the assemblage is cooled, the germanium dissolved in the indium precipitates and forms recrystallized regions 47 and 48 in wafer 41, as illustrated in FIGURE 3*c*. Recrystallized region 47 is formed adjacent emitter electrode 44 and another recrystallized region 48 is formed adjacent collector electrode 46. The recrystallized regions 47 and 48 contain an uncompensated excess of indium acceptor atoms, and hence are of P-conductivity type. The interface between the P-type regions 47 and 48, and the N-type bulk of wafer 41, constitutes rectifying barriers 49 and 50 respectively.

The wafer is now etched lightly to clean up the region immediately adjacent the periphery of the alloyed electrodes. This may be conveniently accomplished by treating the wafer 15 minutes in a bath of 20% hydrogen peroxide maintained at 70° C. Alternatively, the wafer may be electrolytically pulse etched in 20% potassium hydroxide. The unit is then completed by attaching a lead wire to each electrode pellet, making a base connection to the wafer, and encapsulating the device by techniques known to the art.

During the heating step both indium electrode pellets tend to spread laterally over the wafer, but the extent of such spreading is limited by the silicon oxide coating 45 around each electrode. The size and shape of the rectifying barriers 49 and 50 associated with the electrodes is thus similarly limited by the original size and shape of the electrode pellets. Accordingly, when surface alloyed devices are made according to this embodiment, uniformity in the size and shape of the electrode pellets insures uniformity in the size and shape of the rectifying barriers, and hence in the electrical parameters of the completed devices.

The embodiment of the invention described next relates to stabilization of the surface, and hence stabilization of surface-dependent electrical parameters of a surface alloyed junction device.

*Example III*

A surface alloyed transistor is fabricated by coaxially alloying electrode pellets 54 and 56 to opposing major faces of a given conductivity type semiconductor wafer 51, as illustrated in FIGURE 4*a*. The electrode pellets 54 and 56 contain a material capable of inducing opposite conductivity type in the wafer 51. Opposite conductivity zones 57 and 58 are formed in the wafer adjacent electrodes 54 and 56 respectively. The interface between zones 57 and 58 and the bulk of the wafer constitutes rectifying barriers 59 and 60 respectively. The assemblage is then electrolytically pulse etched in 20% KOH to clean the surface of the wafer, and a metal base tab 62 is soldered to wafer 51 around electrode 54. The device is completed by attaching lead wires 64 and 66 to electrodes 54 and 56 respectively.

Referring now to FIGURE 4*b*, the completed transistor is positioned in proximity to jet 20 of the apparatus previously described in connection with FIGURE 1, so that the temperature of the jet stream impinging on the device is about 150° C. A silicon oxide coating 55 about 5000 Angstroms thick is deposited over the exposed surface of wafer 51 and electrode pellets 54 and 56. The unit is then encapsulated and cased by methods known to the art.

It has been found that the electrical parameters of surface alloyed devices treated in accordance with this embodiment of the invention exhibit improved stability as compared to similar untreated devices. For example, it was found that the D.C. gain factor of prior art surface alloyed indium-germanium PNP transistors decreased 18.8% after 1000 hours of storage at 85° C. In contrast, the D.C. gain factor of similar transistors coated with silicon oxide as described in Example III was found to decrease only 2.9% after 1000 hours of storage at 85° C.

What is claimed is:

1. The method of applying a protective coating upon a semiconductor device, comprising the steps of thermally decomposing an organic siloxane compound at a temperature above 600° C., then mixing the decomposition products with an inert gas and forcing the mixture through a jet so as to impinge upon and coat said device at a temperature of about 130° C. to 300° C.

2. The method of applying a protective coating upon a semiconductor device, comprising the steps of thermally decomposing an organic siloxane compound at a temperature above 600° C., then mixing an inert carrier gas with the thermal decomposition products of said compound and causing the mixture to impinge upon said device at a temperature of about 130° C. to 300° C. to deposit a coating containing said decomposition products thereon.

3. The method of applying a silicon oxide coating upon a semiconductor device, comprising the steps of thermally decomposing an organic siloxane compound in a furnace at a temperature above 600° C., then sweeping a carrier gas selected from the group consisting of nitrogen, helium, neon, and argon through said furnace to force the thermal decomposition products of said compound through a jet so as to impinge upon said wafer at a temperature of about 130° C. to 300° C. and form a silicon oxide coating over said device.

4. The method of fabricating a semiconductor device, comprising the steps of masking a portion of a given conductivity type semiconductive wafer, thermally decomposing an organic siloxane compound at a temperature above 600° C., mixing the decomposition products with an inert gas and forcing the mixture through a jet so as to impinge upon and coat the unmasked portions of said wafer at a temperature of about 130° C. to 300° C., then alloying at least one electrode pellet to the uncoated portion of said wafer, said electrode pellet containing material capable of inducing opposite conductivity type in said wafer.

5. The method of fabricating a transistor comprising the steps of masking portions of two opposing major faces of a given conductivity type semiconductive wafer, thermally decomposing an organic siloxane compound at a temperature above 600° C., mixing the decomposition products with an inert carrier gas selected from the group consisting of nitrogen, helium, neon, and argon to force the thermal decomposition products of said compound through a jet so as to impinge upon and coat the unmasked portion of said wafer at a temperature of 130° C. to 300° C., and alloying an electrode pellet to each uncoated portion of said two opposing major wafer faces, each said pellet containing a substance capable of inducing opposite conductivity type in said wafer.

6. The method of fabricating a semiconductor device comprising the steps of affixing at least one given conductivity type electrode pellet to a major face of an opposite conductivity type semiconductive wafer, thermally decomposing an organic siloxane compound in a furnace at a temperature above 600° C., forcing the decomposition products of said compound, mixed with an inert gas, through a jet so as to impinge upon said wafer and coat said face with a protective coating except for the portion of said face shadowed by said pellet, said impinging jet being at a temperature of about 130° C. to 300° C., then alloying said electrode pellet to said wafer.

References Cited in the file of this patent

UNITED STATES PATENTS

| | | |
|---|---|---|
| 2,748,325 | Jenny | May 29, 1956 |
| 2,796,562 | Ellis et al. | June 18, 1957 |
| 2,841,510 | Mayer | July 1, 1958 |
| 2,854,358 | Schwartz | Sept. 30, 1958 |
| 2,873,221 | Nijland et al. | Feb. 10, 1959 |
| 2,911,539 | Tanenbaum | Nov. 3, 1959 |
| 2,913,358 | Harrington et al. | Nov. 17, 1959 |
| 2,932,594 | Mueller | Apr. 12, 1960 |
| 3,006,791 | Webster | Oct. 31, 1961 |

FOREIGN PATENTS

| | | |
|---|---|---|
| 529,354 | Canada | Aug. 21, 1956 |
| 672,163 | Great Britain | May 14, 1952 |